March 30, 1937.  G. P. LESSMANN  2,075,121
RESISTANCE WELDING APPARATUS
Filed Aug. 15, 1935
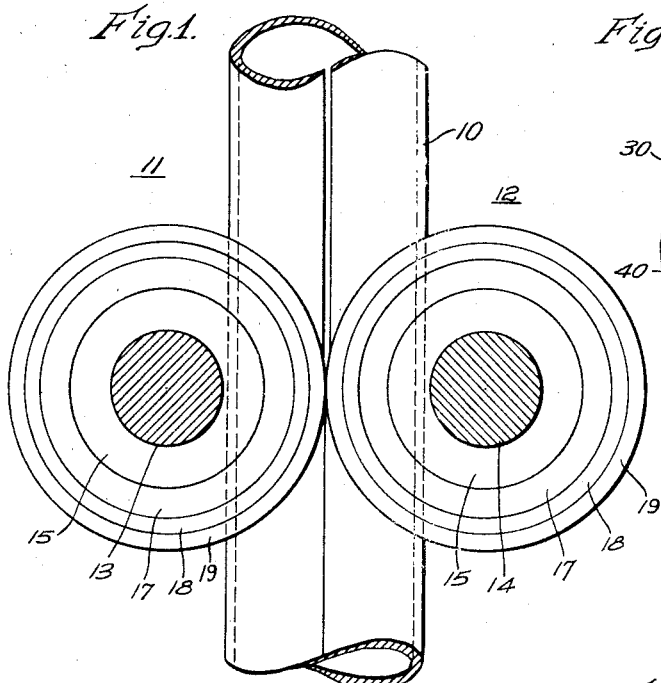
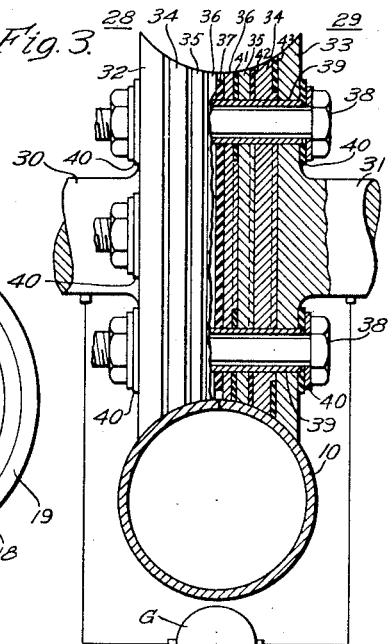
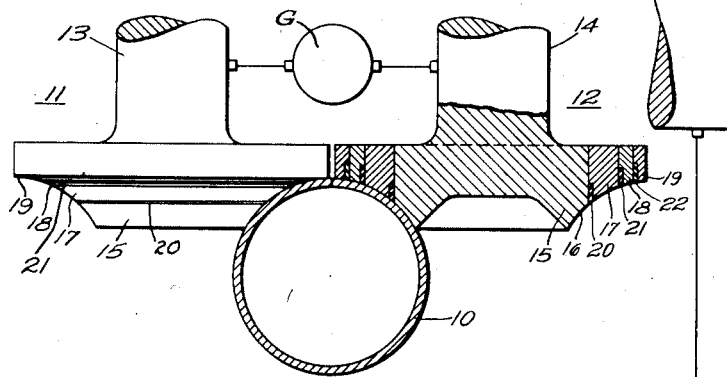
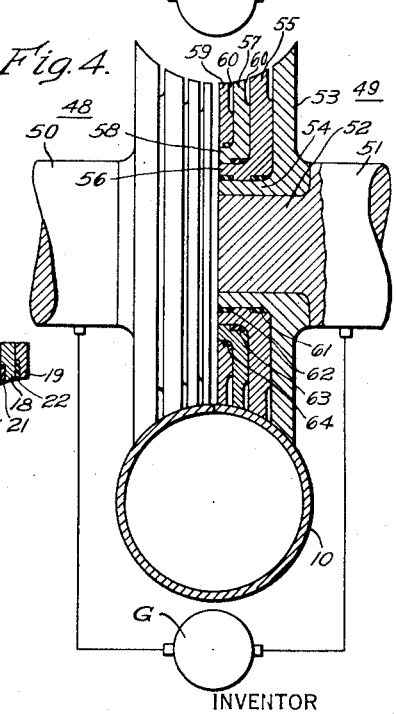
WITNESSES:
C. J. Weller.
R. R. Lockwood
INVENTOR
Gerhard P. Lessmann.
BY
M. Crawford
ATTORNEY Patented Mar. 30, 1937

2,075,121

UNITED STATES PATENT OFFICE 2,075,121

RESISTANCE WELDING APPARATUS

Gerhard P. Lessmann, Forest Hills, Wilkinsburg, Pa., assignor to Westinghouse Electric & Manufacturing Company, East Pittsburgh, Pa., a corporation of Pennsylvania Application August 15, 1935, Serial No. 36,311

19 Claims. (Cl. 219—4)

My invention relates, generally, to electric resistance welding and it has particular relation to the construction of roller welding electrodes therefor.

The welding electrodes of the prior art, of which I am aware, that have been employed for the resistance welding of longitudinal joints or seams in work pieces, such as pipe blanks and the like, have been of unitary construction insofar as the work-engaging contact portion thereof, is concerned. That is, a single undivided contact surface has been provided, across which the welding current flows into the surface of the work piece or out of it into the contact surface, as the case may be, to perform the welding operation.

When such a construction is employed, the flow of welding current into the welding blank across the contact surfaces of the welding electrodes is not uniform. There is a marked tendency for the welding current to concentrate at certain restricted portions of the contact surfaces of the electrodes. This current concentration may be due in part to irregularities in the surface of the work piece, to non-uniform contact pressure, and to possibly other reasons. Because of the non-uniformity of current flow and concentration thereof resulting in exceptionally high current densities, severe burning takes place which injures the contact surface of the electrodes and also the surface of the work pieces. In some instances, the burning is so severe that the work pieces are burned entirely through, and in other instances, portions of the work pieces become welded or fused to the welding electrodes.

The object of my invention, generally stated, is to provide a resistance welding electrode which shall be simple and efficient in operation and which may be readily and economically manufactured and installed.

The principal object of my invention is to prevent the burning of the contact surfaces of roller resistance welding electrodes and the work surfaces in engagement therewith.

An important object of my invention is to provide for distributing the flow of welding current across the surfaces of welding electrodes which are employed for performing resistance welding operations.

Another important object of my invention is to provide for causing the welding current to flow through welding electrodes employed for performing resistance welding operations along predetermined paths into and out of the work pieces being welded.

Another object of my invention is to provide a roller resistance welding electrode with a plurality of contact members, each disposed to successively engage the surface along one of the abutting edges of work pieces to be welded together at succeeding lesser distances from the abutting edges.

Still another object of my invention is to provide a roller resistance welding electrode having a plurality of contact members secured together, connected to a source of welding current, each disposed to successively engage the surface along one of the abutting edges of work pieces at succeedingly lesser distances from the abutting edges and having an insulating medium interposed between the contact members to direct the flow of welding current along predetermined paths.

Other objects of my invention will, in part, be obvious and, in part, appear hereinafter.

Accordingly, my invention is disclosed in the embodiments hereof shown in the accompanying drawing and comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawing, in which:

Figure 1 is a top plan view showing the arrangement of welding electrodes for welding the longitudinal seam or joint in a pipe blank;

Fig. 2 is a view, partly in end elevation and partly in section, showing in more detail the construction of the electrodes illustrated in Fig. 1;

Fig. 3 is a view, partly in end elevation and partly in section, showing another embodiment of my invention; and Fig. 4 is a view, partly in end elevation and partly in section, showing another embodiment of my invention.

Referring now particularly to Figs. 1 and 2 of the drawing, the reference character 10 designates a work piece which, as illustrated, may comprise a pipe blank, the abutting edges of which form a joint or seam across which welding current is caused to flow in order to weld the abutting edges. Welding electrodes, shown generally at 11 and 12, are arranged to engage the surfaces along the abutting edges of the joint, as illustrated, in order to permit the conduction of welding current to and from the pipe blank 10 for performing the welding operation.

As is more clearly shown in Fig. 2 of the drawing, the electrodes 11 and 12 are mounted for rotation about vertical axes on arbors or shafts 13 and 14, respectively, which are arranged to be driven by any suitable means (not shown). As the pipe blank 10 is moved relative thereto, welding current may be conducted to the arbors 13 and 14 by suitable conductors from a generator G which may be either of the direct-current or alternating-current type.

As illustrated in the cross-sectional view of the electrode 12 in Fig. 2, it terminates in a cylindrical portion 15 having a curved surface 16 corresponding to the curvature of the pipe blank 10 and which is disposed to engage the blank to conduct welding current thereto through a restricted portion of the surface. According to prior practice, the welding electrode 12 has been of such construction that the contact surface 16 uninterruptedly extends up to the joint formed by the abutting edges of the pipe blank 10. With such a construction, as has been pointed out hereinbefore, there is a tendency for the welding current to concentrate due to irregularities in the surface of the pipe blank 10 caused by scale and also due to non-uniformity of contact pressure between the welding electrode and the pipe blank so that severe burning may result.

In order to obviate the condition of current concentration with resulting high current densities, I have provided for directing and controlling the flow of welding current along a plurality of paths to the surface of the pipe blank 10. For this purpose, I have provided a plurality of contact rings 17, 18 and 19 which are arranged to be concentrically disposed on the cylindrical portion 15 of the arbor 14. The contact rings may be secured to the cylindrical portion of the arbor, such, for example, as by shrinking them thereon, one over the other, as shown.

The contact rings 17, 18 and 19 are each provided with a curved contact surface or face forming a continuation of the curved surface 16 for engagement with the pipe blank 10. The resistance of the mutually engaging contact surfaces between the rings is sufficient to cause a distribution of the flow of current through the rings. This resistance may be altered by varying the degree of contact pressure as the rings are successively shrunk in place.

In order to further restrict the flow of current and to direct its flow along predetermined paths, insulating members 20, 21 and 22, cylindrical in form, may be provided between the various contact rings and the cylindrical member 15. In this manner, it is possible to further direct and control the flow of welding current over the entire contact surface of the welding electrode 12, which is in engagement with the pipe blank 10. The insulating members 20, 21 and 22 may be cylindrical in form, as illustrated, and may be composed of an insulating medium, such as mica or the like, which will withstand the severe stresses applied thereto due to the shrink fit of the contact rings 17, 18 and 19.

I have found that the resistance between successive contact rings may be varied by varying the contact resistance therebetween, which is a function of the degree of stress that is applied when the various contact rings are successively shrunk onto the welding electrode 12. Furthermore, I have found that, by partially oxidizing or otherwise treating the surfaces between the succeeding contact rings, the contact resistance may be altered by varying the degree of stress which is caused by shrinking the successive rings. Thus as stated hereinbefore, in lieu of the mica insulation indicated by the insulating rings 20, 21 and 22, the surfaces of the contact rings may themselves be partly oxidized or otherwise treated to provide the same effect.

Other modifications of the electrode may be made for controlling and directing the flow of current. One of the means for distributing and controlling the flow of welding current across the contact surface of the electrode is to provide the contact rings 17, 18 and 19 with different cross-sectional areas, as illustrated, in combination with varying the degrees of contact resistance between the contact rings. Another means for insuring that the current will be distributed across the contact surface is to provide the rings of materials having different electrical conductivities, that is, rings formed of various copper alloys may be employed in the construction of the rings 17, 18 and 19 of the electrodes so that the flow of welding current will be altered in accordance with the various resistances of the rings. For example, the ring 17 may be composed of a material having a relatively low or high coefficient of resistance, while the succeeding rings 18 and 19 may be constructed of a material having coefficients of resistance of successively correspondingly greater or lesser values.

Referring now particularly to Fig. 3 of the drawing, it will be observed that a further modification of the invention is there shown. As illustrated in this figure, welding electrodes 28 and 29 are provided which are arranged to be mounted on shafts or arbors 30 and 31, respectively, that are disposed to rotate about a horizontal axis. The arbors 30 and 31 terminate in integrally formed plates 32 and 33, respectively, to which may be secured a series of successively thinner contact plates 34, 35 and 36 for each of the electrodes 28 and 29. An insulating member 37, circular in shape, is interposed between the juxtaposed contact plates 36 for maintaining them in spaced insulated relation. Bolts 38 extending entirely through the plates 32 and 33 are provided for securing the various members in close contact engagement. Insulating sleeves 39 and insulating washers 40 are provided for electrically insulating the bolts 38 from the contact members of the electrodes 28 and 29. A generator G is provided, as set forth hereinbefore, and may be connected to the arbors 30 and 31, as illustrated, for supplying welding current thereto.

The various contact plates 34, 35 and 36 may be partially insulated from each other and from the plates 32 and 33 by oxidizing or otherwise treating the mutually engaging contact surfaces or by means of insulation ring plates 41, 42 and 43. By this means, it is possible to direct the flow of welding current through the various contact plates without permitting it to be concentrated, as would be the case if the welding electrodes 28 and 29 were of integral construction.

The same provisions as set forth hereinbefore may be provided in the construction of the welding electrodes 28 and 29 for directing the flow of current along the desired paths. Thus, the various plates may be made of materials having different coefficients of resistance, the mutually engaging contact surfaces of the contact plates may be oxidized or otherwise treated, and the various contact plates may be made of successively decreasing thicknesses, all as set forth hereinbefore.

It may not be possible to obtain the desired contact pressure between the various contact plates of the modification of the invention illustrated in Fig. 3. That is, it may not be possible to tighten the bolts 38 to such a degree that the contact resistance between the various plates will be as desired. Therefore, the construction illustrated in Fig. 4 of the drawing may be employed.

In the construction illustrated in Fig. 4, welding electrodes 48 and 49 are provided and arranged to be carried by arbors or shafts 50 and 51, respectively. Since the construction of both electrodes 48 and 49 is identical, only the construction of the electrode 49, which is shown in section, will be set forth in detail. As illustrated, the arbor 51 terminates in a reduced portion 52, on which may be shrunk a contact ring or plate 53 which terminates in a collar 54. The contact plate 53 and collar 54 may be heated and then placed on the reduced section 52 of the arbor 51, and on being allowed to cool, a shrink fit will be provided between the collar 54 and the reduced portion 52. In like manner, another contact ring or plate 55 may be provided having a centrally located collar 56 which may be shrunk on the projecting portion of the collar 54, as illustrated. Still another contact ring or plate 57 may be provided having a collar portion 58 that may be shrunk on the extended portion of the collar 56. Finally, a contact ring 59 may be shrunk on the remaining projecting portion of the collar 58 to complete the electrode 49. In order to insure that the welding current will flow in the desired manner from the various contact plates, each of them may be provided with a recess 60 so that the contact plates may individually engage the surface of the pipe blank 10.

In order to further provide for directing and controlling the flow of welding current, insulating members 61, 62, 63 and 64, cylindrical in form, may be interposed between the various succeeding contact plates, as illustrated. It will be observed that the insulating members 61, 62, 63 and 64 are positioned between the surfaces of the contact plates, to which the shrinkage stresses are applied. By regulating the degree of shrinkage, it is possible to regulate the contact resistance between the succeeding contact rings or plates. Since the lateral surfaces of the contact plates are in mutual engagement only and substantially no transverse stress is applied thereto, substantially no welding current will flow across the vertical surfaces of the contact rings or plates, but rather the entire flow will be confined to the contact surfaces therebetween to which the shrinkage stresses are applied. In order to insure that there is no flow of current between the vertical surfaces, they may be oxidized or given a treatment which will provide a high contact resistance therebetween.

Since certain further changes may be made in the foregoing constructions, and different embodiments of the invention may be made without departing from the scope thereof, it is intended that all matter set forth in the foregoing description or shown in the accompanying drawing shall be interpreted as illustrative and not in a limiting sense.

I claim as my invention:

1. A roller electrode for engaging the surface along one of the longitudinal abutting edges of a pipe blank or the like to conduct welding current thereto comprising, in combination, a rotatably mounted arbor, a plurality of mutually engaging contact members carried by said arbor and each disposed to engage said surface at different distances from said abutting edges, and insulating means interposed between a portion of the mutually engaging surfaces of said contact members to effect a distribution of welding current therebetween.

2. An electrode for engaging the surface along one of the abutting edges of a pipe blank or the like comprising, in combination, an arbor, a plurality of contact members shrunk on said arbor one over the other and each disposed to engage said surface at different distances from said abutting edges, means for connecting said contact members to a welding current source, and insulating means interposed between a portion only of the engaging surfaces of said contact members for distributing the welding current therebetween.

3. A roller electrode for engaging the surface along one of the longitudinal abutting edges of a pipe blank or the like comprising, in combination, an arbor, a plurality of mutually engaging contact members carried by said arbor and each having a contact surface disposed to engage said surface of the pipe blank at different distances from said abutting edges, means for connecting said contact members to a welding current source, and insulating means interposed between the engaging portions of said contact members adjacent said contact surfaces for distributing the welding current between said contact members.

4. A roller electrode for engaging the surface along one of the longitudinal abutting edges of a pipe blank or the like comprising, in combination, an arbor, a plurality of contact members carried by said arbor and each disposed to engage said surface at different distances from said abutting edges, said contact members being disposed in mutual contact engaging relation under pressure, means for connecting said contact members to a welding current source, and insulating means disposed between said contact members and subject to the pressure therebetween for causing the welding current to flow to said surface from the entire area of the said contact members in engagement therewith.

5. An electrode for engaging the surface along one of the abutting edges of a pipe blank or the like comprising, in combination, an arbor having a contact surface for engaging said blank, and a contact ring shrunk on said arbor and disposed to engage said blank.

6. An electrode for engaging the surface along one of the abutting edges of a pipe blank or the like comprising, in combination, a rotatably mounted arbor, and a plurality of contact rings shrunk on said arbor one over the other and each disposed to engage said surface at successively lesser distances from said abutting edges.

7. An electrode for engaging the surface along one of the abutting edges of a pipe blank or the like comprising, in combination, a rotatably mounted arbor, and a plurality of contact rings of decreasing cross-sectional area successively shrunk on said arbor one over the other and disposed to engage said surface at different distances from said abutting edges.

8. An electrode for engaging the surface along one of the abutting edges of a pipe blank or the like comprising, in combination, an arbor having a contact surface for engaging said blank, a contact ring shrunk on said arbor and disposed to also engage said blank, means for connecting said arbor and contact ring to a current source, and insulating means disposed between said arbor and said ring to regulate the distribution of flow of welding current therebetween.

9. An electrode for engaging the surface along one of the abutting edges of a pipe blank or the like comprising, in combination, a rotatably mounted arbor, a plurality of contact rings shrunk on said arbor one over the other and each having a contact face disposed to engage said pipe surface at successively lesser distances from said abutting edges, means for connecting said contact rings to a source of welding current, and insulating means disposed between the engaging shrunk surfaces of said contact rings adjacent said contact faces to regulate the division of welding current therebetween.

10. An electrode for engaging the surface along one of the abutting edges of a pipe blank or the like comprising, in combination, an arbor disposed to rotate about a vertical axis, a plurality of contact rings successively shrunk on said arbor and disposed to engage said surface at different distances from said abutting edges, means for connecting said contact rings to a source of welding current, and insulating means of cylindrical form positioned between the juxtaposed surfaces of said contact rings adjacent said surface to partially insulate said rings from each other, thereby effecting a predetermined flow of welding current through each of said rings.

11. An electrode for engaging the surface along one of the abutting edges of a pipe blank or the like comprising, in combination, an arbor having a contact surface for engaging said blank, a contact plate secured to said arbor and disposed to also engage said blank, means for connecting said arbor and contact plate to a current source, and insulating means disposed between said arbor and said plate to regulate the distribution of flow of welding current therebetween.

12. An electrode for engaging the surface along one of the abutting edges of a pipe blank or the like comprising, in combination, an arbor disposed to rotate about a horizontal axis, a plurality of contact plates secured to said arbor and disposed to engage said surface at different distances from said abutting edges, and insulating ring plate means positioned between the juxtaposed surfaces of said contact plates adjacent said surface to partially insulate said contact plates from each other, thereby effecting a predetermined flow of current through each of said contact plates.

13. An electrode for engaging the surface along one of the abutting edges of a pipe blank or the like comprising, in combination, an arbor disposed to rotate about a horizontal axis, and a plurality of contact plates shrunk onto said arbor one over the other and disposed to engage said surface.

14. An electrode for engaging the surface along one of the abutting edges of a pipe blank or the like comprising, in combination, an arbor, a plurality of contact plates shrunk on said arbor one over the other and each disposed to engage said surface at successively lesser distances from said abutting edges, means for connecting said contact plates to a source of welding current, and insulating material interposed between a portion of the engaging shrunk surfaces of said contact plates to regulate the distribution of welding current therebetween.

15. An electrode for engaging the surface along one of the abutting edges of a pipe blank or the like comprising, in combination, an arbor disposed to rotate about a horizontal axis, a plurality of contact plates successively shrunk on said arbor and disposed to engage said surface at successively lesser distances from said abutting edges, means for connecting said contact plates to a source of welding current, and insulating means of cylindrical form disposed between the engaging shrunk surfaces of said contact rings to partially insulate said contact plates from each other, thereby effecting a predetermined flow of welding current through each of said rings.

16. An electrode for engaging the surface along one of the abutting edges of a pipe blank or the like comprising, in combination, an arbor, a plurality of contact plates provided with integrally formed centrally located collar portions to permit said contact plates being successively shrunk on said arbor, means for connecting said contact plates to a source of welding current, and insulating means of cylindrical form disposed between the engaging surfaces of said collar portions to partially insulate said contact plates from each other, thereby effecting a predetermined flow of welding current through each of said contact plates.

17. An electrode for conducting current to a work piece to perform a resistance welding operation comprising a plurality of mutually engaging contact members characterized by the provision of an appreciable amount of contact resistance therebetween for controlling the distribution of current flow therethrough.

18. An electrode for conducting current to a work piece to perform a resistance welding operation comprising a plurality of mutually engaging contact members characterized by the provision of insulating means therebetween in such manner as to partially insulate them from each other to control the distribution of current flow therethrough.

19. An electrode for conducting current to a work piece to perform a resistance welding operation comprising a plurality of mutually engaging contact members, and means for varying the contact resistance between said members to control the distribution of current flow therethrough.

GERHARD P. LESSMANN.